Patented June 23, 1953

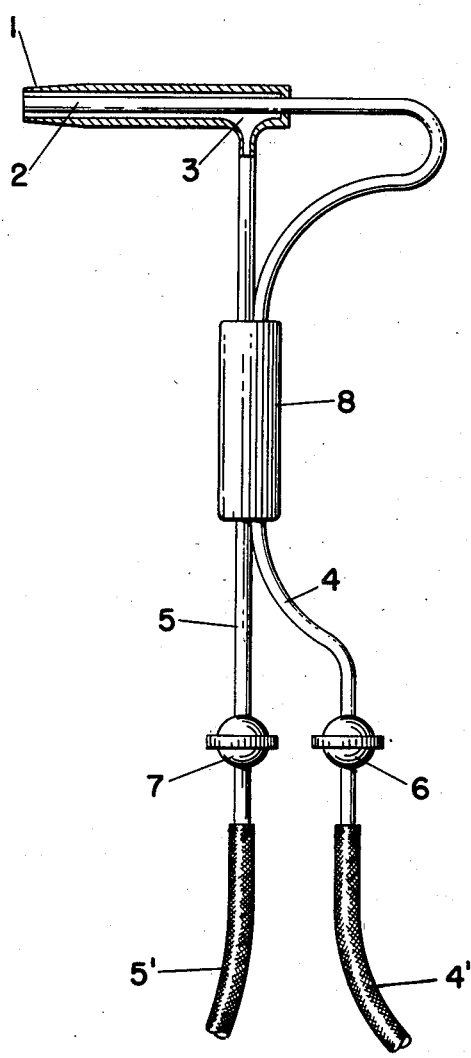

2,642,656

UNITED STATES PATENT OFFICE 2,642,656

METHOD OF WELDING OR CUTTING METAL AND OTHER MATERIALS BY CHLORINE FLUORIDE TORCH

Aristid V. Grosse, Haverford, Pa., assignor of one-half to Jacque C. Morrell, Merion, Pa.

Application January 15, 1948, Serial No. 2,485

8 Claims. (Cl. 29—358)

This invention relates to a method of welding or cutting metal and refractory materials. More particularly it relates to a method of welding or cutting and lancing copper and copper containing alloys such as brass, bronze, Monel metal and other nickel copper alloys and the like employing chlorine fluorides generally and chlorine trifluoride ($ClF_3$) specifically and hydrogen containing gaseous fuels such as hydrogen itself, and various hydrocarbon gases e. g. methane, propane, acetylene, etc.

In the past, operators have found it very difficult to weld copper and similar metals. Two reasons have been advanced for this difficulty, one principally chemical and the other mainly physical. The first is that a copper oxide is formed which prevents the weld from being properly formed. The second reason is that copper has such high thermal conductivity that the heat flows away from the part to be welded before the weld can take place properly. This latter reason also makes it difficult to cut copper by means of a torch.

As a copatentee and coauthor, I am aware of the recently patented and published method of welding copper employed by Priest and Grosse using fluorine and hydrogen. However, chlorine trifluoride has great advantages over fluorine in ease of handling.

Chlorine trifluoride can be readily liquified and thus is readily handled as a liquid in cylinders occupying only a small fraction of the volume that fluorine does. A cylinder of chlorine trifluoride may hold about thirty times the weight of material as one of the same volume containing fluorine. The cylinder may be of much lighter construction and, therefore, much less costly.

Chlorine trifluoride produces a much hotter flame than oxygen or any substance used for cutting metal or welding at the present with the exception of fluorine. This high temperature provides the interesting and useful application of employing it and I intend to use my present invention generally to cut, lance or weld such materials as ceramics, fused quartz, duriron and similar materials containing silica or of an aluminum silicate character and refractory materials generally containing silicon which has heretofore been too difficult or too uneconomical to do in the past. In the case of the latter material the torch not only cuts by virtue of its high temperature but also by chemical reaction.

Chlorine trifluoride may be readily produced by passing chlorine and fluorine, which are gases, or chlorine monofluoride, also a gas, and fluorine through a copper reaction tube heated to about 250° C. It should be more economical to make or use than fluorine because of the chlorine content. In this connection it is also contemplated utilizing and employing chlorine monofluoride in connection with my present invention and for the uses described above.

One object of the present invention is to provide a method of welding metal and the other materials mentioned by means of the combustion of chlorine fluorides and hydrogen containing gases generally and more specifically chlorine trifluoride and hydrogen and hydrocarbon gases. A second object is to provide a welding torch burning hydrogen or hydrocarbon gases and chlorine fluorides, e. g. chlorine trifluoride to weld or cut copper and copper containing alloys.

Other objects of the invention will appear in the description to follow and which is illustrated by the drawing.

The single figure in the drawing shows a partly sectioned side elevation of the welding torch.

The hydrogen or hydrocarbon gases and the chlorine monofluoride or chlorine trifluoride may be burned in several types of torch but the concentric type has proved very satisfactory. As shown in the drawing the torch tip 1 is provided with an inner passage or channel 2 and an outer passage 3. Chlorine monofluoride or chlorine trifluoride is supplied to the inner passage 2 through pipe 4 which is connected by a flexible connection 4' to a storage tank of the chlorine fluoride e. g. chlorine trifluoride. Hydrogen or the hydrocarbon gas is supplied to the outer passage 3 from pipe or tube 5 which is likewise connected by flexible connection 5' to a second storage tank of hydrogen or hydrocarbon gas. Valves 6 and 7 are used to control the flow of the chlorine trifluoride and the hydrogen or hydrocarbon gas. 8 is a handle.

While I have shown the use on the one hand of chlorine fluorides and hydrogen containing gases on the other hand, neither the chlorine monofluoride and the chlorine trifluoride are equivalent nor are the hydrogen and hydrocarbon gases equivalent. E. g., the chlorine trifluoride is a liquid when stored in closed containers under slight pressure and, therefore, may require warming up e. g. by steam jacketing the cylinder or the use of steam generally to vaporize it whereas the chorine monofluoride is a gas. Also chlorine trifluoride can be paired more readily with the hydrocarbon gases than the chlorine monofluoride while it is preferred to use hydrogen with both where high temperature is the main objective, e. g. in fusing siliceous materials the chlorine trifluoride is selected because it provides an intense flame which approximates a temperature in excess of 3000° C. This also helps to overcome the high thermal conductivity of the metal when the later is welded. However, the use of the term chlorine fluoride herein includes both the monofluoride and the trifluoride.

The chlorine fluoride is generally kept in excess over the hydrogen containing gaseous fuel to prevent oxidation and forms the chloride and fluoride in sufficient amount to protect the metal. It is also intended to employ oxygen or, air, in combination with the chlorine fluoride and this is contemplated as a part of our invention.

Some metals may be attacked by the chlorine fluorides but I have found that when copper is exposed to them a coating of copper fluoride and chloride is formed which retards further action. The torch may be made of any suitable metal such as copper, nickel alloys containing more than 60% copper, iron and iron alloys and other metals. The chlorine fluoride should be applied to the torch at a greater pressure than the hydrogen or hydrocarbon gas.

At the welding point, a protective layer of copper chloride and fluoride having relatively low melting point, is formed over the weld which acts as a flux to prevent oxidation of the molten copper. Therefore, no external flux need be used although certain fluxes may be used to advantage. Any flux used must be one preferably that will remain molten until the welded copper hardens.

During the reaction between the hydrogen or hydrocarbon gas and the chlorine fluoride a protective atmosphere of hydrogen chloride and fluoride is formed which protects the weld from oxidation. Under some circumstances the hydrogen chloride and fluoride may become annoying to the operator, but this may be minimized by the use of a mask containing soda lime and/or other suitable materials or doing the welding under a hood.

The torch described herein may be used to weld other metals than copper. It is especially useful in welding metals with high thermal conductivity and those which oxidize readily as well as the refractory materials mentioned. The torch may also be used for cutting or lancing these materials. Its action is similar to that of the oxyacetylene torch in cutting steel.

The use of fluorine may be helpful in vaporizing the chlorine trifluoride and it is contemplated employing mixtures in my invention. When employing either oxygen or fluorine in combination with the chlorine fluorides, an additional channel or passage and valve control may be provided.

Obviously many changes and refinements may be made in the method and apparatus shown and described herein without departing from the invention, and we desire the foregoing description to be considered as illustrative and not restrictive of the broad scope of the invention.

I claim:

1. A method of welding comprising heating the material to be welded to a welding temperature by the combustion of a gaseous fuel selected from the group comprising hydrogen and hydrocarbon gases and a supporter of combustion comprising a chlorine fluoride in sufficient amounts to increase the temperature of the flame.

2. A method of welding or cutting a refractory material containing silicon comprising heating said refractory material containing silicon to a welding or cutting temperature with a flame formed by the combustion of hydrogen with chlorine trifluoride.

3. A method of welding or cutting a refractory material containing silicon comprising heating said refractory material containing silicon to a welding or cutting temperature with a flame formed by the combustion of a gaseous hydrocarbon with chlorine trifluoride.

4. A method of welding or cutting a refractory material containing silicon comprising heating said refractory material containing silicon to a welding or cutting temperature with a flame formed by the combustion of acetylene with chlorine trifluoride.

5. A method of welding or cutting which comprises heating the material to be welded or cut to a welding or cutting temperature with a flame formed by the combustion of a gaseous fuel selected from the group comprising hydrogen and hydrocarbon gases and in the presence of a supporter of combustion comprising chlorine trifluoride, the said chlorine trifluoride being present in sufficient amount to increase the temperature of the flame.

6. A method of welding or cutting a refractory material containing silicon comprising heating said refractory material containing silicon to a welding or cutting temperature with a flame formed by the combustion of a gaseous fuel selected from the group comprising hydrogen and hydrocarbon gases and in the presence of a supporter of combustion comprising chlorine trifluoride, the said chlorine trifluoride being present in sufficient amount to increase the temperature of the flame.

7. A method of cutting or welding, comprising heating the material to be cut or welded to a welding or cutting temperature by the combustion of fuel selected from the group comprising hydrogen and hydrocarbon gases in the presence of a supporter of combustion comprising a chlorine fluoride the said chlorine fluoride being present in sufficient amount to increase the temperature of the flame.

8. A method of cutting a material comprising heating the said material to a cutting temperature by the combustion of fuel selected from the group comprising hydrogen and hydrocarbon gases in the presence of a supporter of combustion comprising a chlorine fluoride the said chlorine fluoride being present in sufficient amount to increase the temperature of the flame.

ARISTID V. GROSSE.

References Cited in the file of this patent

UNITED STATES PATENTS

| Number | Name | Date |
|---|---|---|
| 2,043,212 | Krauss | June 6, 1936 |
| 2,421,649 | Priest et al. | July 3, 1947 |
| 2,439,159 | Dillinger | Apr. 6, 1948 |

OTHER REFERENCES

"Thorpe's Dictionary of Applied Chemistry," fourth edition volume V, pages 275-277; published by Longmans, Green & Co., New York, N. Y.

The Welding Encyclopedia, eleventh edition, page 288, Table 1.

Handbook of Chemistry and Physics, twenty-fourth edition, page 402. Published by Chemical Rubber Publishing Co., Cleveland, Ohio.